Patented Mar. 15, 1938

2,111,436

UNITED STATES PATENT OFFICE 2,111,436

PROCESS FOR TREATING CARBONACEOUS MATERIAL

Paul F. Pie, Jr., Newark, Del., assignor to Darco Corporation, Wilmington, Del., a corporation of Delaware No Drawing. Application December 20, 1935, Serial No. 55,430

3 Claims. (Cl. 252—3)

This invention relates to granular activated carbon and consists in an improved process for treating carbonaceous materials and the product thereof.

In the treatment of liquids with activated carbon, the carbon is frequently used as a filter bed, a slurry or in some other manner wherein the carbon must be submerged in a body of the liquid to be treated. For example, in filtration equipment it has been customary to pass the liquid to be treated downwardly through a bed of granular activated carbon which is occasionally "back washed" by an upward flow of the liquid. Filters normally having an upward flow have also been proposed. In making a slurry of powdered carbon it is necessary that the carbon be thoroughly dispersed in liquid.

A difficulty heretofore encountered with certain types of activated carbon is that when placed in the liquid, the carbon has a tendency to wet slowly and to float or merely suspend itself in the liquid. This refusal of the carbon to sink is distinctly a disadvantage. If it is desired to form a bed of granular carbon, a portion of the floating carbon is above the liquid surface and is unavailable as sorption surface. In addition, the submerged portion of the carbon is not properly wetted and the pores are inaccessible to the substances which the carbon can adsorb. It is obvious that during periods of "back wash" and in filters where the normal flow is upward, these difficulties are aggravated. The carbon fails to form a stable bed and tends to be washed out of the filter.

Powdered activated carbon which has this tendency to wet slowly and to float is equally objectionable. When placed in liquid to form a slurry it refuses to disperse properly and merely floats on the surface of the liquid. Considerable agitation is required to submerge the powdered carbon. Unless the agitation is continued for some time the particles are not completely and thoroughly wetted resulting in a decrease in the available sorption surface.

An object of my invention is the provision of a readily wettable and sinkable activated carbon.

It is a further object of my invention to produce activated carbon, the pores of which contain a gas other than air, said gas being readily soluble in the liquid to be treated with the carbon.

Another object of my invention is to facilitate the wetting of activated carbon with water. Still another object is to devise a process for converting activated carbon which is non-sinkable in water into activated carbon which is readily sinkable in water.

I have found that if the air in the pores of the activated carbon is replaced with a gas which is readily soluble in the liquid to be treated, the carbon will sink immediately when contacted with the liquid, and the difficulties heretofore mentioned are overcome. The soluble gas may be adsorbed by the carbon directly as the carbon is discharged from the activating furnace, or a non-sinkable carbon containing adsorbed air may be suitably treated to make it sinkable.

For example, if it is desired to produce activated carbon which is readily sinkable in water, the activated carbon may be discharged from the activating furnace into a cooling atmosphere of carbon dioxide, air being substantially excluded from the carbon. The carbon so produced contains adsorbed carbon dioxide. Although the solubility of carbon dioxide in water varies greatly with the pressure of the gas, the capillary forces in the carbon pores are apparently responsible for a condition equivalent to high pressure on the gas, for when the carbon is contacted with water the water is sucked into the pores, dissolves the carbon dioxide, and immediately sinks the carbon.

Other suitable gases, which when adsorbed by the carbon render it sinkable in water, are chlorine and sulphur dioxide.

Chlorine dissolves in water readily to form a mixture of hypochlorous acid and hydrochloric acid. Since the hypochlorous acid is a strong oxidizing agent it may react with the carbon to form oxides of carbon and hydrochloric acid. Hydrogen chloride is very soluble in water.

Sulphur dioxide dissolves readily in water to form sulphurous acid.

I have found that activated carbon which is non-sinkable in water may be made sinkable by replacing the air in the pores of the carbon with a water soluble gas. For example, the non-sinkable carbon may be heated in a suitable vessel to a temperature in the neighborhood of 250° C. The residual air is then swept from the vessel by a stream of the water soluble gas, and the carbon is cooled to about 40° C. in an atmosphere of the gas. The activated carbon so treated has a sufficient quantity of water soluble gas adsorbed therein to render it sinkable when contacted with water and no agitation or stirring is required. Water soluble gases suitable for converting non-sinkable carbon to sinkable carbon in this manner are carbon dioxide, chlorine and sulphur dioxide.

Activated carbon containing a gas soluble in the liquid to be treated has been found to possess many advantages. It can be used to form a firm compact filter bed without tending to wash away. The liquid to be treated is apparently drawn or sucked into the pores of the carbon upon contact therewith so that the full sorption capacity is immediately available. Although there is to be no limitation with respect to the type of carbon which may be treated in accordance with my process, a decided advantage is the fact the product need not have a block density greater than the density of the liquid to be treated and at the same time it is readily wettable and sinkable therein. This results in a considerable saving in shipping and handling costs over those carbons which have increased block densities to render them sinkable.

It is to be understood that the foregoing examples are merely illustrative of the invention and are not to be taken as limiting.

What I claim is as follows:

1. The process of facilitating the wetting of activated carbon with water, which comprises cooling the hot activated carbon from a temperature of at least about 250° C. down to a temperature of about 40° C. while maintaining it in an atmosphere of a readily water-soluble gas selected from the group consisting of carbon dioxide, chlorine and sulphur dioxide and while substantially excluding air from the carbon, whereby the pores of the cooled activated carbon are substantially filled with said gas and said carbon is rendered readily sinkable in water, and thereafter contacting the water with the activated carbon thus obtained.

2. The process of facilitating the wetting of activated carbon which is non-sinkable in water with which the carbon is to be wetted, which comprises heating the non-sinkable carbon to a temperature in the neighborhood of 250° C., cooling the hot carbon from said temperature down to a temperature of about 40° C., while maintaining it in an atmosphere of a readily water-soluble gas selected from the group consisting of carbon dioxide, chlorine and sulphur dioxide and while substantially excluding air from the carbon, whereby the pores of the cooled activated carbon are substantially filled with said gas and said carbon is rendered readily sinkable in water, and thereafter contacting the water with the activated carbon thus obtained.

3. The process of facilitating the wetting of activated carbon which is non-sinkable in water with which the carbon is to be wetted, which comprises heating the non-sinkable carbon to a temperature in the neighborhood of 250° C., sweeping the residual air from the carbon by a stream of a readily water-soluble gas selected from the group consisting of carbon dioxide, chlorine and sulphur dioxide, and cooling the hot carbon down to a temperature of about 40° C. while maintaining it in an atmosphere of said gas and while substantially excluding air from the carbon, whereby the pores of the activated carbon are substantially filled with said gas and said carbon is rendered readily sinkable in water, and thereafter contacting the water with the activated carbon thus obtained.

PAUL F. PIE, Jr.